(12) United States Patent
Thrun et al.

(10) Patent No.: US 7,961,934 B2
(45) Date of Patent: Jun. 14, 2011

(54) PROBABLE RECONSTRUCTION OF SURFACES IN OCCLUDED REGIONS BY COMPUTED SYMMETRY

(75) Inventors: Sebastian Thrun, Stanford, CA (US); Eliot Leonard Wegbreit, Palo Alto, CA (US)

(73) Assignee: Strider Labs, Inc., Palo Alto, CA (US)

( * ) Notice: Subject to any disclaimer, the term of this patent is extended or adjusted under 35 U.S.C. 154(b) by 1682 days.

(21) Appl. No.: 11/009,314

(22) Filed: Dec. 10, 2004

(65) Prior Publication Data

US 2005/0128197 A1 Jun. 16, 2005

Related U.S. Application Data

(60) Provisional application No. 60/529,386, filed on Dec. 11, 2003.

(51) Int. Cl.
*G06K 9/00* (2006.01)
*G01C 9/00* (2006.01)

(52) U.S. Cl. ................ 382/154; 382/107; 702/152

(58) Field of Classification Search ............. 382/154, 382/107; 702/152
See application file for complete search history.

(56) References Cited

U.S. PATENT DOCUMENTS

| | | | |
|---|---|---|---|
| 5,109,425 A * | 4/1992 | Lawton | 382/107 |
| 5,608,818 A | 3/1997 | Chini et al. | |
| 5,802,201 A | 9/1998 | Nayar et al. | |
| 5,821,943 A | 10/1998 | Shashua | |
| 5,917,937 A | 6/1999 | Szeliski et al. | |
| 6,028,672 A | 2/2000 | Geng | |
| 6,046,763 A | 4/2000 | Roy | |
| 6,147,760 A | 11/2000 | Geng | |
| 6,377,353 B1 * | 4/2002 | Ellis | 356/603 |
| 6,539,330 B2 * | 3/2003 | Wakashiro | 702/152 |
| 6,549,289 B1 * | 4/2003 | Ellis | 356/603 |
| 6,614,429 B1 | 9/2003 | Zhang et al. | |

(Continued)

FOREIGN PATENT DOCUMENTS

JP   03-138784   6/1991

(Continued)

OTHER PUBLICATIONS

Improving environment modelling by edge occlusion surface completion; Castellani, U.; Livatino, S.; Fisher, R.B. 3D Data Processing Visualization and Transmission, 2002. Proceedings. First International Symposium on, vol., Iss., 2002 pp. 672-675.*

(Continued)

*Primary Examiner* — Hadi Akhavannik
(74) *Attorney, Agent, or Firm* — Gard & Kaslow LLP

(57) ABSTRACT

A system for obtaining a probable 3D map of an occluded surface of an object is provided. The system receives an initial 3D map of a visible surface of the object and identifies one or more symmetries of the initial 3D map. The system computes the probable 3D map of the occluded surface by projecting points of the initial 3D map into occluded regions of space according to the identified symmetries. The system can also comprise an imager for obtaining the initial 3D map. The actual occluded surface cannot be known with absolute certainly because it is occluded; however, the computed 3D map will closely resemble the actual occluded surface in many instances because most objects possess one or more symmetries and the computed 3D map is based on such symmetries that are identified in the initial 3D map of the object.

59 Claims, 7 Drawing Sheets

U.S. PATENT DOCUMENTS

| | | |
|---|---|---|
| 6,643,396 B1 | 11/2003 | Hendriks et al. |
| 6,674,877 B1 | 1/2004 | Jojic et al. |
| 6,700,669 B1 | 3/2004 | Geng |
| 6,701,006 B2 | 3/2004 | Moore et al. |
| 6,728,582 B1 | 4/2004 | Wallack |
| 6,744,435 B2 | 6/2004 | Zwicker et al. |
| 6,750,873 B1 | 6/2004 | Bernardini et al. |
| 6,750,975 B2 | 6/2004 | Takeda et al. |
| 6,791,542 B2 | 9/2004 | Matusik et al. |
| 6,803,910 B2 | 10/2004 | Pfister et al. |
| 6,816,629 B2 | 11/2004 | Redlich |
| 2002/0171644 A1 | 11/2002 | Reshetov et al. |
| 2003/0072482 A1 | 4/2003 | Brand |
| 2003/0072483 A1 | 4/2003 | Chen |
| 2003/0231793 A1 | 12/2003 | Crampton |
| 2004/0105580 A1 | 6/2004 | Hager et al. |
| 2004/0126006 A1 | 7/2004 | Chang |
| 2004/0208358 A1 | 10/2004 | Tooyama et al. |

FOREIGN PATENT DOCUMENTS

| | | |
|---|---|---|
| JP | 04-124779 | 4/1992 |
| JP | 05-073664 | 3/1993 |
| JP | 09-005050 | 1/1997 |
| JP | 2002-286415 | 10/2002 |

OTHER PUBLICATIONS

Symmetry as a continuous feature Zabrodsky, H.; Peleg, S.; Avnir, D. Pattern Analysis and Machine Intelligence, IEEE Transactions on, vol. 17, Iss.12, Dec. 1995 pp. 1154-1166.*

3-D reconstruction using mirror images based on a plane symmetry recovering method Mitsumoto, H.; Tamura, S.; Okazaki, K.; Kajimi, N.; Fukui, Y. Pattern Analysis and Machine Intelligence, IEEE Transactions on, vol. 14, Iss.9, Sep. 1992 pp. 941-946, figure 7.*

Shape reconstruction in projective grid space from large number of images Saito, H.; Kanade, T. Computer Vision and Pattern Recognition, 1999. IEEE Computer Society Conference on., vol. 2, Iss., 1999 pp. -54 vol. 2.*

3-D reconstruction using mirror images based on a plane symmetry recovering method Mitsumoto, H.; Tamura, S.; Okazaki, K.; Kajimi, N.; Fukui, Y. Pattern Analysis and Machine Intelligence, IEEE Transactions on, vol. 14, Iss.9, Sep. 1992 pp. 941-946.*

Blake, A., et al., "Grasping Visual Symmetry", International Conference on Computer Vision, May 1993 pp. 724-733, IEEE.

Han, F. et al., "Bayseian Reconstruction of 3D Shapes and Scenes from a Single Image," Proc. of International Workshop on High-Level Knowledge in 3D Modeling and Motion, 2003, Nice, France.

Kanade, T., "Recovery of the Three-Dimenional Shape of an Object from a Single View," Artificial Intelligence, Aug. 1981, vol. 17, Issues 1-3, pp. 409-460.

Kazhdan, M. et al., "A Reflective Symmetry Descriptor," European Conference on Computer Vision, 2002, pp. 642-656.

Mitsumoto, H. et al., "3-D Reconstruction Using Mirror Images Based on a Plane Symmetry Recovering Method," IEEE Trans. on Pattern Analysis and Machine Intelligence, Sep. 1992, vol. 14, No. 9, pp. 941-946.

Shen, D. et al., "Symmetry Detection by Gneeralized Complex (GC) Moments: A Close-Form Solution," IEEE Transactions on Pattern Analysis and Machine Intelligence, May 1999, vol. 21, No. 5, pp. 466-475.

Sun, C. et al., "3D Symmetry Detection Using the Extended Gaussian Image," IEEE Transactions on Pattern Analysis and Machine Intelligence, Feb. 1997, vol. 19, No. 2, pp. 164-169.

Terzopolulos, D. et al., "Constraints on Deformable Models: Recovering 3D Shape and Nonrigid Motion," Artificial Intelligence, 1988.

Terzopolulos, D. et al., "Symmetry-Seeking Models and 3D Object Reconstruction," International Journal of Computer Vision, 1987, vol. 1, pp. 211-221.

Zabrodsky, H. et al., "Symmetry as a Continuous Feature," IEEE Tranactions on Pattern Analysis and Machine Intelligence, Dec. 1995, vol. 17, No. 12, pp. 1154-1166.

Zabrodsky, H. et al., "Using Bilateral Symmetry to Improve 3D Reconstruction From Image Sequences," Computer Vision and Image Understanding: CVIU, 1997, vol. 67, No. 1, pp. 48-57.

Robert B. Fisher, Solving Architectural Modelling Problems Using Knowledge, School of Informatics, University of Edinburgh, 2003.

* cited by examiner

PROBABLE RECONSTRUCTION OF SURFACES IN OCCLUDED REGIONS BY COMPUTED SYMMETRY

CROSS-REFERENCE TO RELATED APPLICATIONS

This application claims the benefit of U.S. Provisional Patent Application Ser. No. 60/529,386, filed Dec. 11, 2003, entitled "Probable Reconstruction of Surfaces in Occluded Regions by Computed Symmetry," which is incorporated herein by reference in its entirety.

BACKGROUND OF THE INVENTION

1. Field of the Invention

The present invention relates generally to the field of machine perception and more particularly to calculating probable positions in three dimensions of occluded surfaces of viewed objects.

2. Description of the Prior Art

The present invention relates to viewing an object and constructing a 3-dimensional (3D) map of the surface of object, including determining probable maps of those surfaces of the object that are obscured, hidden, or otherwise occluded from the view. In many applications it is necessary or desirable to have such a 3D model of an object. Such applications include computer-aided design, computer-aided manufacturing, electronic commerce, robotics, and digital entertainment. Conventionally, a 3D model of an object is constructed by acquiring images or range data of the object from multiple, widely separated viewpoints. The multiple viewpoints are chosen so that every side of the object is included in images from one or more of the viewpoints. The information from these multiple viewpoints is combined by well-known techniques to create the 3D model.

However, in certain applications, it is either not possible or not economical to view the object from multiple viewpoints, and in some instances even if multiple viewpoints are used, some surfaces still remain occluded. For example, if a robotic system consisting of an arm and a hand is employed to pick and pack unknown objects, the robotic system must determine enough surface information about the unknown objects to plan stable grasps. Cost, physical constraints, or other constraints can limit the number of vision sensors, so that the objects can be viewed only from one perspective. In these situations, surfaces that do not face the vision sensors are hidden from view by the objects themselves. Such surfaces are referred to as being "self-occluded."

Grasping an object with a typical robotic end-effector requires surfaces in a generally opposing relationship. For example, to grasp an object with a parallel-jawed gripper, the object must have a pair of opposing parallel surfaces. Mechanical hands with multiple fingers can grasp objects without parallel contact surfaces, but still require some kind of opposition of the surfaces. An image taken from a single viewpoint provides a description of only some of the surfaces. Using only visible surfaces acquired from a single viewpoint, most desirable grasps cannot be planned, due to a lack of information about one or more of the possibly useful contact surfaces. Hence, for planning a grasp of an object, it is desirable to be able to compute probable surfaces for self-occluded regions.

Additionally, regions of the object may be blocked from a viewing position by the presence of other objects. We refer to such regions as "intra-occluded." Intra-occluded regions present problems similar to those created by self-occlusion. They also cannot be used for grasp planning and thereby limit the kinds of grasps that can be considered in the plan. Hence, it is also desirable to be able to compute probable surfaces for intra-occluded regions.

In other applications, it may be possible to view an object from several sides, but not all sides. Using standard image processing techniques the images from the several visible sides may be composed to obtain a partial surface model that is more complete than one obtained from only a single viewpoint, yet one that is not entirely complete. Here, too, it is desirable to be able to use the partial model to compute probable surfaces for the regions that remain occluded.

In certain applications, it may be desirable or necessary to confirm the probable surfaces using additional sensors. For example, the fingers of the hands may be equipped with force, tactile, or proximity sensors. Alternatively, a camera may be mounted on the end of the arm located to view the surfaces to be grasped. However, even when such additional sensors are present, efficient operation requires that the initial grasping plan made without their sensor readings is correct with high probability.

Hence, in a variety of diverse situations, it is desirable to compute probable surfaces in occluded regions given only the position information from a limited number of viewpoints.

Heretofore, using 3D models of visible surfaces to create 3D models of occluded surfaces has not been addressed. Rather, research has been limited to determining symmetries within 2D and 3D images, and to modeling 3D surfaces from 2D images.

A large number of papers in the scientific literature deal with symmetries in 2D images. For example, D. Shen, H. H. S. Ip, K. K. T. Cheung, and E. K. Teoh, "Symmetry Detection by Generalized Complex (GC) Moments: A Close-Form Solution," *IEEE Trans. on Pattern Analysis and Machine Intelligence*, Vol. 21, No. 5, May 1999 describes how symmetries may be detected in 2D images and cites many earlier papers on this topic. Another paper, A. Blake, M. Taylor, and A. Cox, "Grasping Visual Symmetry," *International Conference on Computer Vision*, pp 724-733, May 1993, shows how 2D symmetries and anti-symmetries may be used to plan grasps of planar objects by grasping around the rim.

There have also been many papers discussing how 3D shapes can be reconstructed from 2D images. A paper by T. Kanade, "Recovery of the three-dimensional shape of an object from a single view," *Artificial Intelligence*, Volume 17, Issues 1-3, August 1981, pp 409-460 is a relatively early paper on this topic. Another paper by H. Mitsumoto, S. Tamura, K. Okazaki, N. Kajimi, and Y. Fukui, "3-D Reconstruction Using Mirror Images Based on a Plane Symmetry Recovery Method," *IEEE Trans. on Pattern Analysis and Machine Intelligence*, Vol. 14, No. 9, September 1992, pp 941, 946 uses a 2D image that contains both an image of an object and an image of that object as reflected by one or more physical mirrors to perform a 3D reconstruction of the visible surfaces of the object. A recent paper by F. Han and S. C. Zhu, "Bayesian inference of 3D scene from a single images," *Proc. of Int'l Workshop on High-Level Knowledge in 3D Modeling and Motion*, Nice France, 2003 infers plausible occluded surfaces from a computed primal sketch of a 2D image. Another paper by H. Zabrodsky, D. Weinshall, "Using Bilateral Symmetry to Improve 3D Reconstruction from Image Sequences," *Computer Vision and Image Understanding: CVIU*, Vol. 67, No. 1, pp 48 to 57, 1997 finds symmetries in 2D images and uses those symmetries to improve reconstructions of visible features in a technique known as "structure from motion." Additionally, two papers by D. Terzopoulos et al., "Symmetry-Seeking Models and 3D Object Reconstruction," *International Journal of Computer Vision*, 1, pp 211-221, 1987 and "Constraints on Deformable Models: Recovering 3D Shape and Nonrigid Motion," *Artificial Intelligence*, 36 (1988) pp 91-123 reconstruct objects having a generalized axial symmetry from 2D data using manual initialization; in the 1988 paper, multiple sets of 2D data are used to obtain 2D outlines from multiple viewpoints.

However, techniques based on 2D images can make only limited use of symmetries to perform 3D reconstructions. This is because a 2D projection distorts 3D symmetries. Accordingly, the relationship between a 3D symmetry of an object and the observed projected 2D image is complex and subject to ambiguity. Hence, research considering 2D images does not address the problems solved by this invention.

There has been less work on the topic of symmetry in 3D data. A paper by C. Sun and J. Sherrah, "3D Symmetry Detection Using the Extended Gaussian Image," *IEEE Trans. on Pattern Analysis and Machine Intelligence*, Vol. 19, No. 2, February 1997, pp 164-169 describes how 3D symmetries that are global to an object may be detected by converting the problem to the correlation of a Gaussian image. A paper by R. Zabrodsky, S. Peleg, and D. Avnir, "Symmetry as a Continuous Feature," *IEEE Trans. Pattern Analysis and Machine Intelligence*, vol. 17, no. 12, pp. 1,154-1,166, December 1995 defines a continuous symmetry measure to quantify the symmetry of both 2D and 3D objects; the paper applies this measure to finding the orientation of 3D symmetries. Another paper by M. Kazhdan et al., "A Reflexive Symmetry Descriptor," *European Conference on Computer Vision*, 2002, pp 642-656 describes how mirror symmetries that are global to an object can be detected in a 3D voxel model of the object. However, none of these papers addresses the problem of reconstructing occluded 3D surfaces from 3D data.

Hence, there is a need for a system and method able to reconstruct probable occluded surfaces from 3D data.

SUMMARY

The present invention provides a system for obtaining a probable 3D map of an occluded surface of an object. In some embodiments the system comprises a computing device configured to receive an initial 3D map of a visible surface of the object as viewed from a known viewpoint, identify one or more symmetries of the initial 3D map, and compute the probable 3D map of the occluded surface from the identified one or more symmetries and the initial 3D map. In some other embodiments the system comprises an imager and a computing device. In these embodiments the imager is configured to acquire an initial 3D map of a visible surface of the object. Additionally, the computing device is configured to identify one or more symmetries of the initial 3D map, and compute the probable 3D map of the occluded surface from the one or more identified symmetries and the initial 3D map. In still other embodiments the system comprises means for acquiring an initial 3D map of a visible surface of the object as viewed from a known viewpoint, means for identifying one or more symmetries of the initial 3D map, and means for computing the probable 3D map of the occluded surface from the one or more identified symmetries and the initial 3D map.

The present invention also provides a method for determining a probable 3D map of an occluded surface of an object. The method of the invention comprises the steps of acquiring an initial 3D map of a visible surface of the object as viewed from a known viewpoint, identifying one or more symmetries of the initial 3D map, and computing the probable 3D map of the occluded surface from the identified one or more symmetries and the initial 3D map. The present invention also provides a computer-readable medium comprising program instructions for performing the steps of the method.

The present invention additionally provides a robotic system comprising an arm terminating in an end-effector having components for grasping an object, an imager, and a computing device. In these embodiments the imager is configured to acquire an initial 3D map of a visible surface of the object. Also in these embodiments the computing device is configured to identify one or more symmetries of the initial 3D map, compute a probable 3D map of the occluded surface from the identified one or more symmetries and the initial 3D map, and compute a grasp for the end-effector, the grasp describing positions of one or more of the components for grasping relative to the probable 3D map of the occluded surface.

DETAILED DESCRIPTION

Briefly described, the invention is a system for computing probable 3D surfaces of occluded regions of an object. The system acquires 3D position data (a 3D map) for visible parts of the object as seen from some, but not necessarily all, vantage points. The system determines both symmetries within the 3D position data for the visible parts of the object and the domains over which the symmetries apply. The system then uses the symmetries and domains to compute probable 3D surfaces in occluded regions.

In the preferred embodiments, each potential symmetry is scored using a function that describes how well the visible surface data and the shape of the occluded region agree with that symmetry. Symmetries that are used to determine the probable 3D representations of the occluded surfaces are found by searching for an optimal value of the scoring function in the space of symmetry features and domains. The system then uses the highest scoring symmetries to compute probable 3D surfaces in occluded regions.

Computing surfaces in occluded regions from only visible surfaces is inherently an under-defined problem as there is not sufficient information in the visible surfaces to derive an unambiguous reconstruction. For instance, it could be that a viewed object that appears to be a regular box is nothing more than three walls with nothing behind them. Alternatively, the same object could conceivably extend for a considerable distance behind the visible surfaces in a direction along the viewing axis, so that the visible surfaces hide what lies behind. In practice, neither extreme is likely to be the case.

Prior knowledge about objects in the world makes these cases highly improbable.

The system of the invention disclosed herein uses prior knowledge of objects in the world to compute probable 3D maps for occluded surfaces. Specifically, the system relies on the fact that many objects have various symmetry properties. If an object has a particular symmetry, then visible surfaces must be consistent with that symmetry. Moreover, it is typically the case that if the visible region, or a part of the visible region, displays a particular symmetry, then the occluded region, or part of the occluded region, also participates in, and is consistent with, that symmetry. Thus, the presence of a symmetry in a visible region of an object can be taken as probable evidence that the symmetry extends to the occluded regions. The invention disclosed herein uses this evidence to infer occluded surfaces from the symmetries in the visible region.

Various kinds symmetries are utilized by this invention. These symmetries can be global to an entire object or local to identifiable part of the object. When a symmetry is local, it is applied to a suitably chosen part of the visible region to infer corresponding occluded surfaces of the object.

Figure 1:
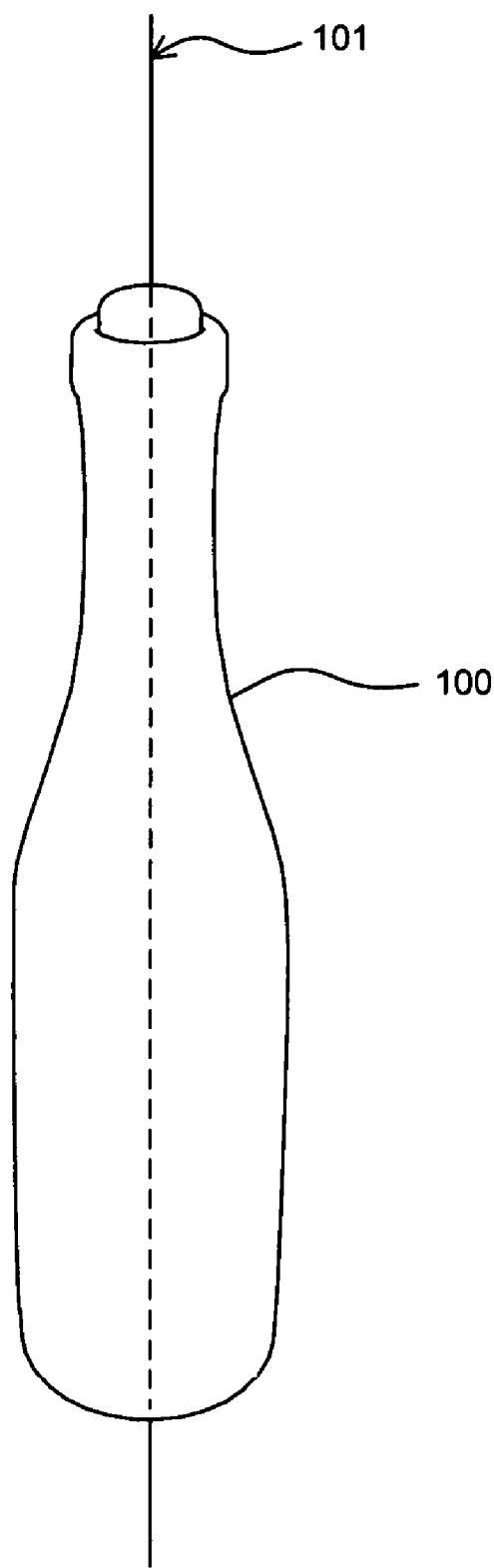
FIG. 1 is a perspective view of a bottle having an axis of rotational symmetry.

A few simple examples will illustrate the concept. FIG. 1 shows a bottle 100 having an axis of rotational symmetry 101, as viewed from a typical viewing position. Because of the rotational symmetry of the bottle 100, points on the visible surface have corresponding points on the self-occluded surface that is hidden by the bottle 100. These corresponding points provide a nearly complete surface description from which, for example, a grasp may be calculated.

Figure 2:
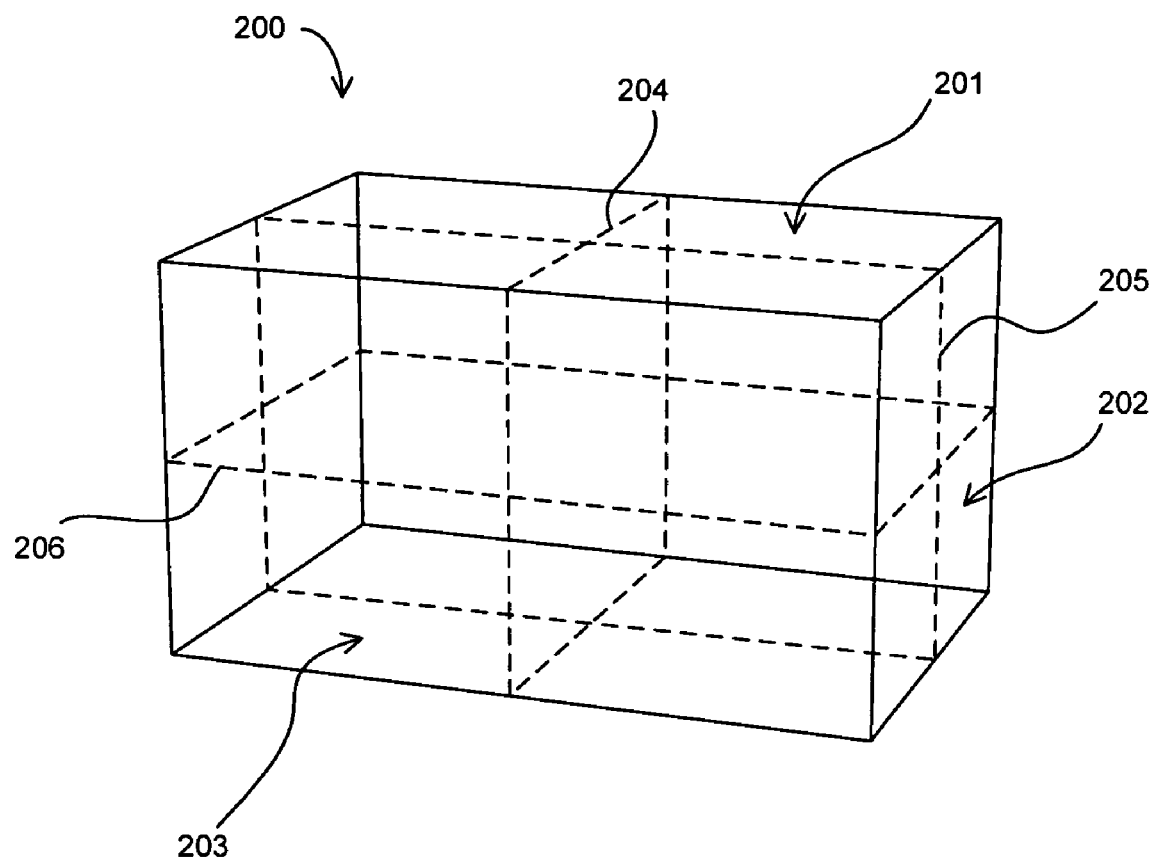
FIG. 2 is a perspective view of a box with three orthogonal mirror planes indicated.

FIG. 2 shows a box 200 viewed such that a top 201 and two sides 202 and 203 are visible. The top 201 is a rectangle and has two orthogonal mirror plane symmetries indicated by mirror planes 204 and 205. Mirror plane 204 is consistent with one of the visible sides 202. Mirror plane 205 is consistent with the other visible side 203. Because the box 200 includes these two mirror plane symmetries, points on the two visible sides 202 and 203 have corresponding points on two of the self-occluded surfaces hidden from the viewpoint. Additionally, the two sides 202 and 203 each have a mirror plane symmetry represented by mirror plane 206 that is parallel to the top 201 of the box 200. Due to this additional mirror symmetry, points on the top 201 of the box 200 have corresponding points on a bottom surface. Hence, by mapping and identifying the three visible surfaces 201, 202, and 203 in three dimensions, and by identifying the three mirror planes 204, 205, and 206 of the visible surfaces 201, 202, and 203, enough information is available to construct symmetrically situated occluded surfaces.

It will be appreciated that the reconstructions of the occluded surfaces is merely a prediction of what cannot be seen; but in many real-world applications the predictions made by the invention are often very good because man-made and natural objects so frequently have a variety of symmetries. It should also be noted that for many real-world applications, such as robotic gasping, a perfect understanding of the occluded surfaces is not necessary and therefore a prediction that is a good approximation is adequate.

Figure 3:
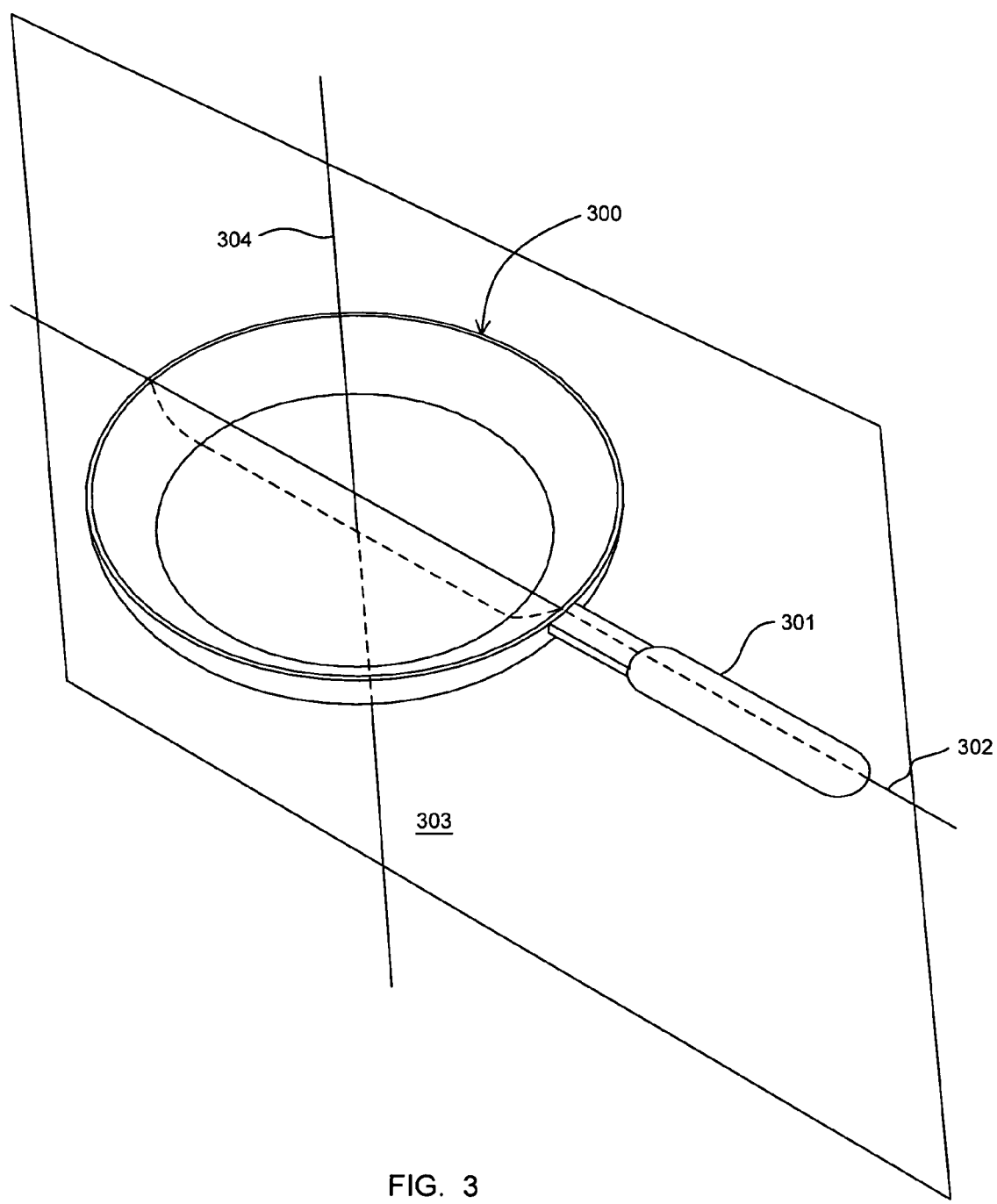
FIG. 3 is a perspective view of a frying pan having both global and local symmetries.

FIG. 3 shows a more complex example in which a frying pan 300 having a cylinder-like handle 301 is viewed from a typical viewing position. The frying pan 300 has a vertical plane of mirror symmetry 303 that passes through the handle 301 and the center of the pan 300. Using the plane of mirror symmetry 303, much of the handle 301 may be reconstructed. There are also two local axes of rotational symmetry, 302 and 304. Both are "local" in the sense that they apply only to a part of the surface—one applies to the handle, and one to the pan without the handle. Notice that the handle can be reconstructed from either the mirror plan of symmetry or the axis of rotational symmetry. The reconstruction of the handle using the axis of rotational symmetry will almost always be complete, whereas the reconstruction using the plane of mirror symmetry will typically be incomplete (unless the viewing angle is such that all of the handle on one side of the mirror plane is visible.) Accordingly, symmetry types are ranked and when several symmetries apply, the symmetry with the highest ranking type is used in reconstruction.

To better illustrate the invention, exemplary embodiments referred to as the preferred embodiments for convenience, will be described in particular detail, followed by a discussion of alternative implementations.

Preferred Embodiments

Figure 4:
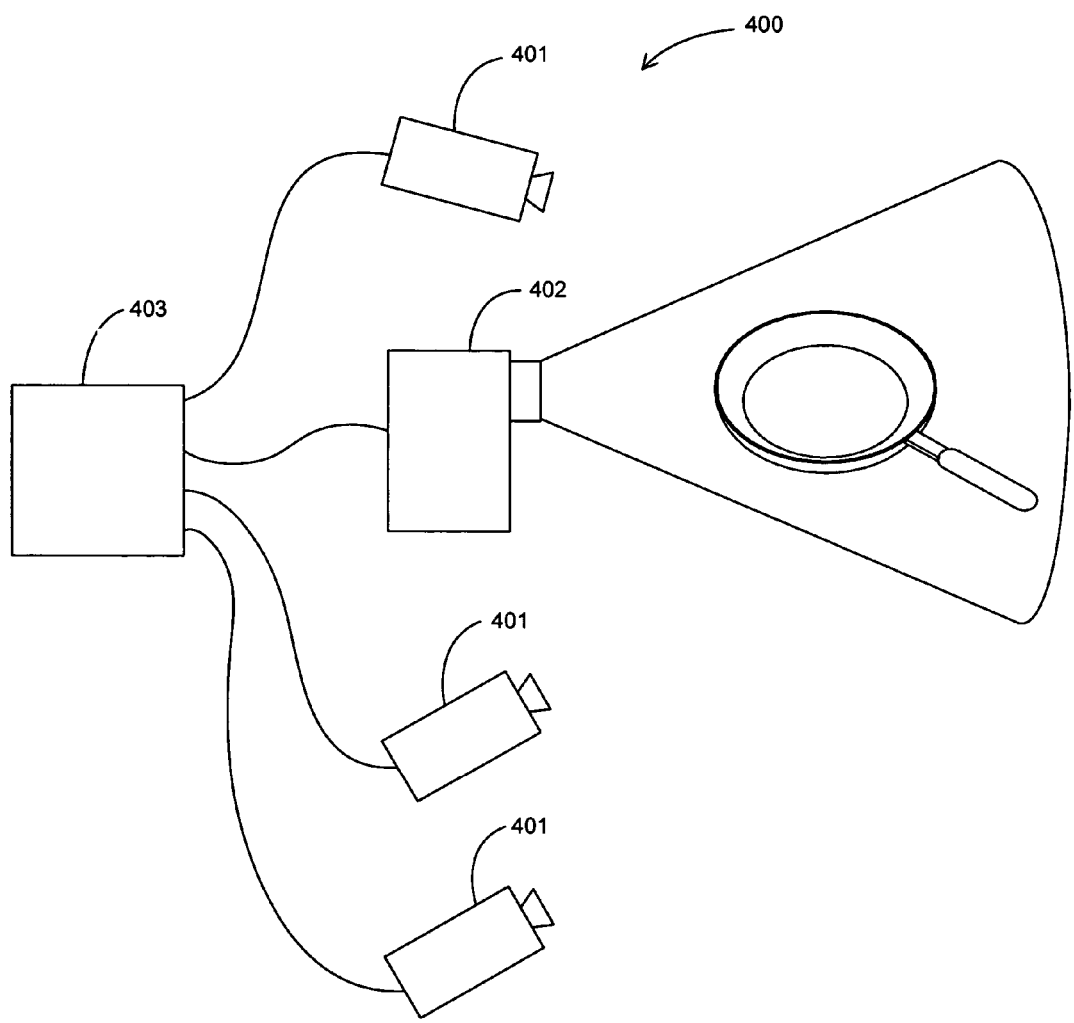
FIG. 4 is a schematic drawing of an imager configured to acquire a 3D map of a visible surface of an object according to an embodiment of the present invention.

FIG. 4 is a schematic drawing of an imager 400 configured to acquire a 3D map of a visible surface of an object, in accordance with an embodiment of the invention. The imager 400 includes three cameras 401 that are used to acquire images of a scene from three different perspectives. A projector 402 of patterned light is used to provide structured artificial texture to surfaces of objects that are viewed by the cameras 401. A computing device 403 is coupled to receive the images acquired by the cameras 401 and is configured to perform the several computational steps of this invention, as described below.

Figure 5:
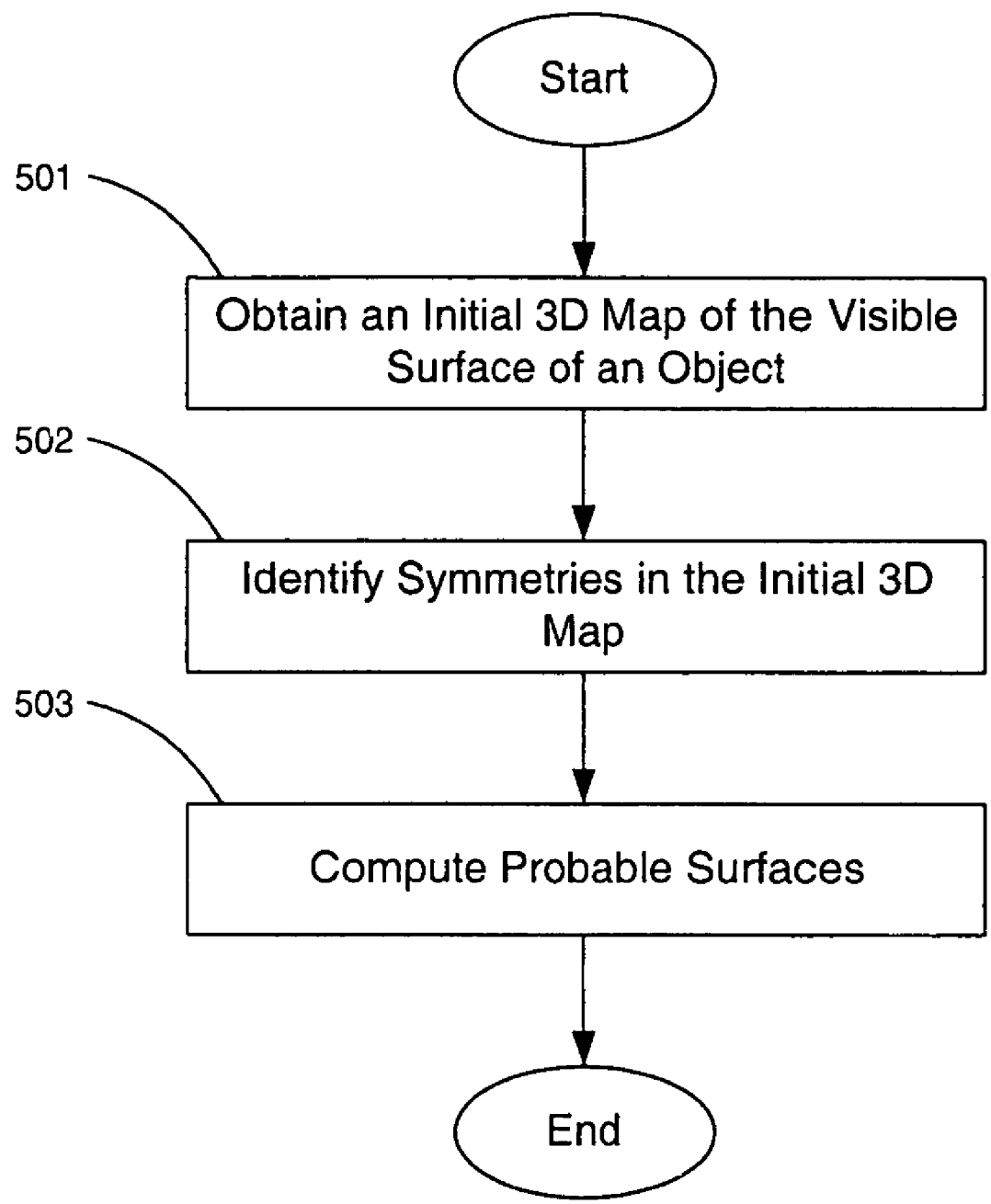
FIG. 5 is a flow diagram showing a method for determining a probable occluded surface according to an embodiment of the present invention.

FIG. 5 is a flow diagram that shows the major steps of a method according to a preferred embodiment of the invention. In a first step 501 a 3D map of the visible portion of an object is obtained. In a step 502 the symmetries within the 3D map are identified. In a step 503, probable surfaces in occluded regions are computed from the identified symmetries.

Referring first to step 501, the 3D map is obtained by first collecting one or more images of the scene and then applying a suitable 3D surface reconstruction process to the images. Such 3D reconstruction processes are well known and typically compute the 3D map by identifying corresponding points in each of several images followed by a triangulation based on the locations of the corresponding points in the images and the geometry of the arrangement of cameras 401 (FIG. 4). This process is often aided by the texture provided by a projected pattern, such as by projector 402 (FIG. 4) and is commonly referred to as "dense stereo with active illumination." An example of such a system is disclosed in U.S. patent application Ser. No. 10/703,831, filed Nov. 7, 2003, which is incorporated herein by reference.

A collection of points having 3-dimensional spatial locations is commonly known as a "point cloud" or sometimes as a "point set." All of the points belonging to a single object are collected into a point cloud for that object. This is referred to as object segmentation. Methods for performing segmentation from range data are well known. The region occluded by the visible surfaces from the viewpoint of the imager is commonly known as an "occluded region."

In step 502, the method next identifies symmetries within the 3D map of the visible regions. In general, symmetries may be global to the entire object, or local to a part of an object. Thus, the definition of a symmetry may require the specification of a subset of the point cloud to which a symmetry feature applies. In the preferred embodiment, this is expressed in the concept of a "part symmetry," which is a data structure that describes the symmetry together with the part of the surface to which the symmetry applies. To better understand the use of symmetries by the invention, part symmetries are described first in general, then methods for evaluating candidate part symmetries are described, then how part symmetries are found, and then, with reference to step 503, how part symmetries are used to compute probable surfaces. Following this, aspects of the invention are provided in a pseudo code, which gives the exemplary steps.

Definition of Part Symmetries

Each part symmetry is defined by three components: a symmetry type, a numerical parameter vector, and a Boolean domain function. The symmetry type is chosen from a small set of admissible types, which characterize the typical symmetry types found in common objects, e.g. mirror planes and rotation axes. The numerical parameter vector specifies the location of the symmetry elements e.g., the orientation and location of a mirror plane relative to the 3D map of the visible surface. The symmetry type and the numerical parameter vector are together referred to herein as a "symmetry feature." A domain function characterizes the sub-region of the visible surface that is consistent with the symmetry feature.

Symmetry Types

A symmetry type defines a specific type of invariance of the surface of a 3D object. A simple example of a symmetrical object is a sphere, which is rotationally symmetric about a point. A symmetry type found in spheres is rotational point symmetry. A cylinder is rotationally symmetric about an axis, and it is also mirror symmetric about a suitably chosen plane orthogonal to its axis. The cylinder is described by two symmetry types, a rotation axis and a mirror plane. More complex shapes can be described by greater numbers of symmetry types, for example, a cube is mirror symmetric about each of the three orthogonal mirror planes.

Symmetry types generally fall into two families, elemental and composite. Elemental symmetry types are defined through one of three geometric shapes: a plane, a line, or a point. Composite symmetry types combine two or more elemental symmetries.

One elemental symmetry type is mirror plane symmetry. Mirror plane symmetry is a symmetry relative to a plane, called a symmetry plane. Each point A on the surface of an object possesses a corresponding surface point A' on the opposite side of the mirror plane. The line connecting A and A' is orthogonal to the mirror plane, intersects it, and the intersecting point cuts the line connecting A and A' into two segments of equal length.

Another elemental symmetry type, mirror axis symmetry, is defined through an axis, called the symmetry axis. Each point A on the object surface possess a corresponding surface point A' on the opposite side of the symmetry axis. The line connecting points A and A' is orthogonal to the symmetry axis, intersects the symmetry axis, and the intersection point cuts the line connecting A and A' into segments of equal length.

Another elemental symmetry type, rotational axis symmetry, is also defined through an axis, but in this symmetry type the axis is a rotational axis. Each point A corresponds to a continuum of points on the object surface, arranged in a circle. This circle contains the point A. It lies in a plane that is orthogonal to the rotation axis, and its radius is the distance of the point A to the axis.

Still another elemental symmetry type is mirror point symmetry. This symmetry is defined through a point, called the symmetry point. Each point A on the object surface possesses a corresponding surface point A' on the opposite side of the symmetry point. The line connecting points A and A' intersects the symmetry point. The symmetry point partitions the line connecting A and A' into segments of equal length.

Yet another elemental symmetry type is rotational point symmetry. This symmetry is also defined through the symmetry point. Each point A on the object surface corresponds to a continuum of other points, arranged on a sphere containing A. Each point on the sphere has equal distance to the symmetry point, and, by definition, the radius of the sphere is the distance between A and the symmetry point.

Composite symmetry types can be constructed from a plurality of elemental symmetry types. For example, a dual mirror plane is constructed from two orthogonal mirror planes. Each point A corresponds to any point A' that can be obtained by applying one of the mirror plane symmetries, or both symmetries in sequence. Another example is a triple mirror plane. This symmetry type is constructed from three orthogonal mirror planes. Each point A on the object surface corresponds to any point A' that can be obtained by applying any subset of the three mirror planes in sequence, including the full set of all three mirror planes.

Still another example is rotational axis symmetry paired with an orthogonal mirror plane. This symmetry is defined through a rotational axis and an orthogonal mirror plane. Each point A on the object surface corresponds to two circles of surface points, one defined through the rotational axis, and one through the rotational axis applied to the point A', where A' is obtained by applying the mirror symmetry to the point A.

Numerical Parameter Vector

Each part symmetry is also characterized by a numerical parameter vector appropriate to the symmetry type. For example, in the case of a symmetry plane, the parameter vector specifies the location and orientation of the plane. Similarly, the parameter vector of an axis symmetry determines the location and orientation of the symmetry axis. The parameter vector of a point symmetry specifies the location of the point. In the case of composite symmetries, additional components of the parameter vector specify the location of the additional symmetry elements.

Domain of a Part Symmetry

Each part symmetry is also characterized by a domain function that defines the part of the visible surface to which the part symmetry applies. The domain function specifies whether a point on the visible surface belongs to that part symmetry and can be a logical attribute that maps visible surface points to either TRUE or FALSE. The domain is the set of points mapped to TRUE. In some embodiments, the domain is a single, contiguous surface region.

For a part symmetry that applies to the entire point cloud of an object, the domain includes all visible surface points. For a non-global symmetry, the domain function makes it possible to restrict a part symmetry to a sub-region on the object surface. This provision is important when objects are composed of multiple parts of different geometric shapes, each characterized by a different symmetry feature. Describing such an object with a single global symmetry often is impossible. Instead, multiple local part symmetries are found, each having a particular symmetry feature and a symmetry domain.

In general, the domain of a part symmetry contains points that have matching points under the symmetry feature and can have additional points that have no matching points but that are not inconsistent with the symmetry feature. A point that is mapped by the symmetry feature into occluded space has no matching point, but is not inconsistent with the symmetry feature and such a point may be included in the domain.

Scoring a Part Symmetry

Referring again to FIG. 5, in step 502 identifying the symmetries within the 3D map requires scoring the potential candidate symmetries. The score is necessary to determine whether a hypothesized symmetry is acceptable. It is also necessary to compare alternative candidate symmetries, so as to arrive at a ranking that prefers more plausible over less plausible symmetries. Such a ranking is obtained by computing a "symmetry score." The symmetry score is used for ranking, accepting, or rejecting a proposed part symmetry, and when choosing between two or more alternative symmetries.

Each part symmetry, denoted <S, x, dom> and consisting of a symmetry type, S, an associated numerical parameter vector, x, and a domain, dom, is scored in three different ways resulting in three numerical scores: $score_1$, $score_2$, and $score_3$. The first of these scores ($score_1$) is obtained by applying the symmetry feature <S, x> to each point in the domain, dom. As a result, each surface point in the domain is mapped to one or more new points, called "projected points." For example, when applying a mirror plane symmetry, a point A is mapped to a single projected point A' on the opposite side of the mirror plane.

When applying a rotational axis symmetry, each point A is mapped to a continuum of projected points that lie on a circle. Embodiments of the invention accommodate the fact that some symmetries map a single point into infinitely many points by sampling a finite number of those points. For example, instead of generating all points under a rotational symmetry, the preferred embodiment generates a finite number of evenly spaced points by sampling the resulting circle or sphere at even intervals.

Each such projected point will fall into one of three mutually exclusive categories. A projected point is classified as a "match" when the projected point is located in the immediate vicinity of the visible surface of the object. The projected point is classified as "occluded" when the projected point is located in an occluded region or outside the visual field of the cameras. The shape of the occluded region can be computed, by well-known techniques, from the combination of the point cloud of the object taken together with the viewpoint of the imager. It will be appreciated that the viewpoint of the imager is determined by the position and orientation of one or more cameras. The projected point is classified as "unexplained" if the projected point is neither matched nor occluded. If a part symmetry is completely consistent with the visible surface, each point will either be classified as matched or occluded, but not unexplained. Hence, the more points that are classified as matched or occluded, the more plausible the part symmetry is at describing the symmetry of the part of the object.

$score_1$ is computed as $$score_1 = (c_{match} n_{match} + c_{occluded} n_{occluded} + c_{unexplained} n_{unexplained})/n$$

where $n_{match}$, $n_{occluded}$, and $n_{unexplained}$, are the number of points that are classified as matched, occluded, and unexplained, respectively, and $$n = n_{match} + n_{occluded} + n_{unexplained}.$$

Here, $c_{match}$ is a positive constant, $c_{occluded}$ is a non-negative constant smaller than $c_{match}$, and $c_{unexplained}$ is a negative constant. The intuition behind this scoring function is that matching points provide strong positive evidence for the existence of a symmetry, while occluded points provide weaker evidence. Unexplained points provide strong negative evidence for the correctness of a symmetry. Only part symmetries that have a $score_1$ value in excess of a threshold value are potentially acceptable.

In some embodiments, the calculation of $score_1$ is performed using sub-sampling. Specifically, a fixed number of representative points is extracted from the domain of a part symmetry and from the complete set of visible points, and the test is only performed based on these representative points. Further, when applying a symmetry feature, a representative set of new points is introduced for those symmetries that induce a continuum of new points. In each of these cases, the number of sampled points is kept modest, in order to make the algorithm computationally efficient.

The remaining two scores, $score_2$ and $score_3$, pertain to attributes of the domain. $Score_2$ measures the size of the domain, for example by the total number of points encompassed by the domain or by the surface area enclosed by the points of the domain. In some embodiments, $score_2$ has to exceed a given threshold for a part symmetry to be potentially acceptable.

$Score_3$ characterizes a "margin" of a domain. A point is on the margin of the domain if the point is part of the domain and is either 1) adjoining a point that is outside of the domain, or 2) adjoining a natural surface boundary in the 3D map of the visible surface, e.g. a depth discontinuity in the 3D point cloud for the original scene. The total number of points that comprise the margin of the domain is represented by the quantity R; the total number of margin points that are adjoining a point that is outside of the domain is represented by the quantity $r_1$; and the total number of margin points that do not adjoin a point outside the domain is represented by the quantity $r_2$. The two sets partition all points in the margin into two mutually exclusive classes. In some embodiments, for a domain to be desirable, the ratio $r_1/(r_1+r_2)$ must be smaller than a threshold. This requirement selects for domains with margins that are significantly defined by points that are adjoining natural surface boundaries. $Score_3$ is computed as $$score_3 = r_1/(r_1+r_2)$$

Comparing $score_2$ and $score_3$ to thresholds is effective for filtering out excessively small or ill-formed domains, such as domains that extend only over a narrow band within a larger surface. As noted, $score_3$ also excludes domains that are not significantly defined by points that are adjoining natural surface boundaries, where the threshold value determines the fraction of margin points that must be adjoining natural surface boundaries.

Figure 6:
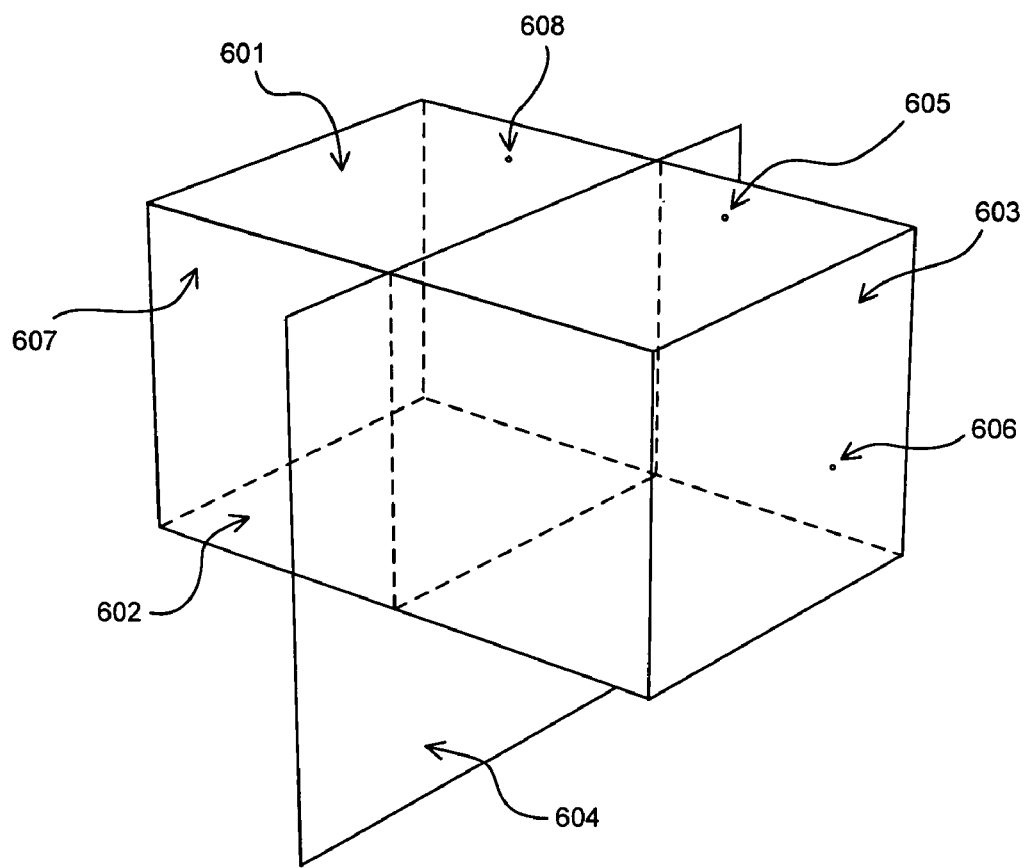
FIG. 6 is a perspective view of a box with one marked mirror plane discussed with reference to a method of scoring identified symmetries according to an embodiment of the present invention.

An example of scoring according to this embodiment will be described with reference to the simple geometry of the drawing of FIG. 6. FIG. 6 shows a box with three visible surfaces, a top surface 601, and two side surfaces 602 and 603. FIG. 6 also shows a mirror plane 604 that cuts the top surface and one of the side surfaces. Under the mirror symmetry, a point 605 on the top surface 601 is projected to a projected point 608 on the top surface 601 on the opposite side of the mirror plane 604. This projected point can be classified as matched, so the projected point from point 605 contributes to a value for $score_1$ according to the positive weighting provided by $c_{match}$.

Under the mirror symmetry, a point 606 on the side 603 is projected to a projected point (not shown) that is occluded by the visible surface, so the projected point from point 606 can be classified as occluded and contributes to $score_1$ according to a smaller non-negative weighting provided by $c_{occluded}$. A single point domain consisting only of the point 605 provides explicit positive evidence of the symmetry as the projected point from point 605 is classified as a match. A single point domain consisting of the point 606 provides no explicit positive evidence of the symmetry, but is consistent with the symmetry.

It will be appreciated, therefore, that a domain computed for a part symmetry can include a group of points that provide explicit positive evidence for the part symmetry and a group of points that provide no explicit evidence but are also not inconsistent with the part symmetry. In a reconstruction, as discussed below in greater detail with respect to step 503, a symmetry feature is applied to all of the points in the associated domain. When this occurs, the points that provide no explicit evidence, but are not inconsistent with the part symmetry, are projected into occluded space where they typically form a probable occluded surface in the occluded space. As shown in FIG. 6, the visible points on the side surface 603 are projected to the opposite side of the mirror plane 604 to form a probable occluded surface 607.

Finding a Part Symmetry

Part symmetries can be identified by searching the space of all candidate part symmetries, and subjecting each candidate to a sequence of acceptance tests. If multiple part symmetries are found, the most useful is chosen according to the ordering induced by a type hierarchy described below. For a proposed part symmetry to be acceptable, in some embodiments, the part symmetry has to pass threshold tests for each of the three scores, $score_1$, $score_2$, and $score_3$.

Symmetry Types in the Search for a Symmetry Feature

The search for a symmetry feature can be made more efficient by exploiting the fact that certain symmetry types induce other symmetry types. For example, each object or object part with rotational point symmetry possesses infinitely many rotational axis symmetries where each axis intersects the point of the rotational point symmetry. As another example, each rotational axis symmetry possesses infinitely many mirror plane symmetries where the rotational axis lies at the intersection of each of the mirror planes. Additionally, each dual mirror plane symmetry possesses two mirror symmetries, and each triple mirror plane symmetry possesses three mirror symmetries.

Accordingly, the preferred embodiment searches the symmetry types in an order. First, the method searches for a mirror plane symmetry type. For any identified mirror plane, the method next searches the space of all rotational symmetry axes that are aligned with the mirror plane. In doing so, the search space for the symmetry axis is reduced, which results in a more efficient search algorithm. If a rotational symmetry axis is found, the method searches for a rotational point symmetry; failing that, it searches for a rotational axis symmetry paired with an orthogonal mirror plane. If a rotational axis is not found, the method searches for multi-mirror plane symmetries. The search order induces a partial ordering on the set of symmetry types that are considered; in this partial ordering, the root node is the mirror plane symmetry type.

Because various symmetries induce other symmetries, it is often the case that multiple symmetries are found. The most desirable symmetries are those that result in the largest number of projected points for a given visible point. For example, a mirror plane results in one projected point for each point in the domain of the symmetry type. A dual mirror plane results in two projected points for each point in the domain, while a rotational axis results in a circle of points, which is an infinite one-dimensional set of points. A rotational point symmetry results in a two-dimensional set of points. Thus, the following hierarchy among the symmetry types is preferred: 1) rotational point symmetry; 2) rotational axis symmetry paired with an orthogonal mirror plane; 3) rotational axis symmetry; 4) triple mirror plane; 5) dual mirror plane; 6) mirror point symmetry; 7) mirror axis symmetry; and 8) mirror plane symmetry.

Searching the Space of Symmetry Parameters

For any specific symmetry type, the determination as to whether a symmetry of this type is acceptable under the criterion set forth above requires the search of a multi-dimensional continuous parameter space. The preferred embodiment performs this search in two steps.

First, the parameter space is searched at discrete points defined by an evenly spaced grid over the space of all numerical parameter vectors. The result of this discrete grid search is a score for each point in the grid. From this, the preferred embodiment identifies local maxima, which are those points possessing scores that are greater than the scores of the immediate neighbors in the grid.

Second, a local parameter optimization is performed, to further improve the symmetry score. This optimization involves modifications of the parameters as a scale smaller than the resolution of the grid. In the preferred embodiment, this optimization is carried out by a hill-climbing search. The result of this search is a numerical parameter vector that locally optimizes the symmetry score.

In the preferred embodiment, there is a joint optimization loop in which the local parameter optimization is interleaved with a search in the space of symmetry domains. This joint optimization loop results in a part symmetry $<S, x, dom>$ with a locally-optimal symmetry score.

Searching the Space of Symmetry Domains

The preferred embodiment implements the search for a domain as follows. First, the set of all visible surface points is divided into two sets: (1) the points from which projected points under the symmetry feature are classified as either matched or occluded, and (2) those points from which projected points under the symmetry feature are classified as unexplained. An initial domain is taken to be the largest connected component in a point cloud defined by the set of points from which projected points under the symmetry feature are classified as either matched or occluded.

The initial domain is then grown by recursively adding points adjoining the domain, up to a predefined growth margin. By doing so, points classified as unexplained, and small isolated islands of such points, are incorporated into the domain. Some of these islands can be within a perimeter of the initial domain. Such an island, if smaller than the predefined growth margin, will become completely incorporated into the domain. Finally, the domain is shrunk by recursively removing points from the margin of the domain that are adjoining other points outside of the domain. A shrinkage margin for this operation can be equivalent to the predefined growth margin. By shrinking the domain, larger numbers of points classified as unexplained are once again removed from the domain. The resulting domain consists of a single contiguous portion of the 3D map of the visible surface. By scoring the domain and verifying that the scores exceed appropriate thresholds, as described above, the domain will be known to be of sufficient size, with a margin that is significantly defined by one or more natural surface boundaries in the 3D map of the visible surface.

Finding a Part Symmetry

To find a single best part symmetry, the preferred embodiment considers all the symmetry types. For each symmetry type, the method uses a fixed grid to sample the space of numerical parameter vectors and find local maxima. For each sampled maxima, the method performs a local search for an optimal part symmetry, carrying out a joint optimization on the numerical parameter vector and the domain. The resulting part symmetry is scored, as described above. Unacceptable part symmetries, those with a value for any of $score_1$, $score_2$, or $score_3$ outside the respective acceptance thresholds, are rejected. Acceptable part symmetries are retained. From these acceptable part symmetries, the one with the highest ranking symmetry type is chosen.

Finding All Part Symmetries

The search for part symmetries is repeated until no additional acceptable part symmetries can be found. In each step of the recursion, the preferred embodiment removes from the set of surface points under consideration all of the surface points that are included in the domains of the previously identified part symmetries. The method then iterates the search for the best acceptable part symmetry using this reduced set of points. This recursive search ultimately terminates, since with each newly identified part symmetry the number of remaining surface points shrinks.

Constructing the Augmented Point Cloud

The remaining step 503 computes probable occludes surfaces. For each identified part symmetry, the symmetry feature is applied to each point in the domain. The resulting projected points form an augmented surface point cloud that represents probable occluded surfaces. Recall from above that a point may be placed in a symmetry domain either because it was classified as matched or occluded. Under a rotational symmetry type, a projected point classified as matched will be replicated many times about the symmetry axis or point, so the rotational symmetry type has a very high utility in reconstruction. Under a mirror symmetry type, a projected point classified as matched has low utility in reconstruction, whereas a projected point classified as occluded has high utility in reconstruction.

Pseudo Code for an Embodiment of the Invention

Figure 7:
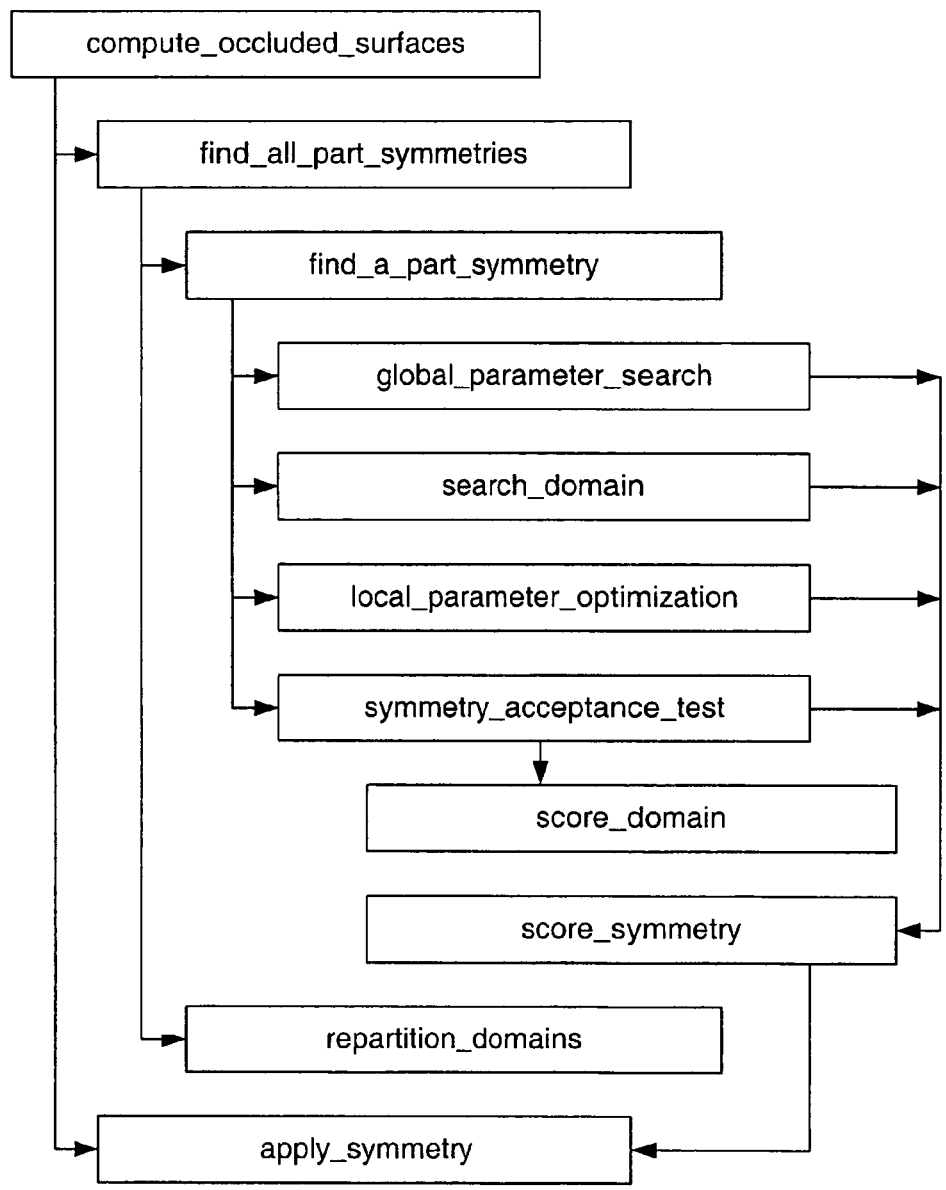
FIG. 7 is a call structure for exemplary pseudo-code for a method for determining a probable occluded surface according to an embodiment of the present invention.

One suitable method for obtaining a 3D map of the visible areas of an object is disclosed in U.S. patent application Ser. No. 10/703,831. The remaining steps of the method of the preferred embodiment can be described in terms of the following procedures. The following procedures are discussed in greater detail below.

compute_occluded_surfaces
    find_all_part_symmetries
    find_a_part_symmetry
    global_parameter_search
    score_symmetry
    score_domain
    apply_symmetry
    search_domain
    local_parameter_optimization
    symmetry_acceptance_test
    repartition_domains FIG. 7 shows a call structure of the preferred embodiment, where an arrow from procedure A to procedure B indicates that procedure A calls procedure B. The procedures listed above are explained below in terms of pseudo code. The pseudo code discussed herein shows only primary steps. For clarity in showing these primary steps, secondary details are omitted. Low low-level procedures whose implementation is straightforward are also omitted.

Several of these procedures make use of global parameters. For example, grid G (used by global_parameter_optimization) is set such that rotational parameters are probed in 10 degrees increments and translational parameters are probed in increments of 5% of the object diameter. Another parameter, margin k (used by search_domain) is set to 30 points. The parameters weights $c_{match}$, $c_{occluded}$, $c_{unexplained}$ (used by score_symmetry) have values of 1, 0, and −15. Additionally, thresholds $\theta$, $\psi$, $\phi$ (used by symmetry_acceptance_test) are given values of 0, 200 points and 0.5. It will be understood that the operation of the present invention is relatively insensitive to the specific values of these parameter and a considerable range of values can be used, instead of the exemplary values listed above, with comparable results.

Some of these values, such as the margin k, depend on the imaging system. Additionally, the values of some of these parameters may be determined by the application. For example, the procedure symmetry_acceptance_test requires, among other things that $score_1$ is greater than $\theta$. In applications where a loose criterion for symmetry is appropriate, $\theta$ may be chosen to be relatively small; conversely, if the application requires a strict criteria for acceptability, $\theta$ may be chosen to be relatively large. Similar considerations apply to the other global parameters: their values may be chosen to meet the needs of a particular application.

The procedure compute_occluded_surfaces is the main procedure. Given an input, original surface point set P, the procedure computes an augmented surface point set P' that represents the probable occluded surfaces. In pseudo code, an exemplary compute_occluded_surfaces procedure reads as follows:

```
compute_occluded_surfaces(P)
begin
    initialize P' = P
    Y = find_all_part_symmetries(P)
    for each part symmetry <S, x, dom> ∈ Y do
        Q = apply_symmetry(dom, S, x)
        set P' = P' + Q
    end for
    return P'
end
```

The procedure find_all_part_symmetries repeatedly finds part symmetries in the 3D map of the visible surface and removes points belonging to the domains of the identified part symmetries until no additional part symmetries can be found. The input is the original surface point set P. The output is a set of part symmetries Y={<S, x, dom>}. In the following pseudo code, set subtraction is denoted by the backslash (\) character. An exemplary find_all_part_symmetries procedure reads as follows:

```
find_all_part_symmetries(P)
begin
    initialize point set Q = P
    initialize part symmetry set Y = Ø
    repeat
        <success, S, x, dom> = find_a_part_symmetry(P, Q)
        if success
            set Q = Q \ dom
            Y = Y + <S, x, dom>
            Y = repartition_domains(P, Y)
        end if
    until not(success)
    return Y
end
```

The procedure find_a_part_symmetry searches each symmetry type and for each type, it samples over a fixed grid to find a set of sampled local maxima of the numerical parameters. For each sampled maximum, the procedure executes a joint optimization loop that interleaves optimization of the domain and optimization of the numerical parameter vector. Finally, the procedure scores the resulting part symmetry to see if it is acceptable. When multiple part symmetries are found, the procedure chooses the one with the highest-ranking type. The input is an original surface point set P and a partial point set Q. The outputs are a Boolean success, symmetry type $S_{best}$, parameter vector $x_{best}$, and domain $dom_{best}$. In pseudo code, an exemplary find_a_part_symmetry procedure is shown below. In order to show the most significant aspects, this pseudo code does not exploit the efficiency gains that can be obtained by using the fact that certain symmetry types induce other symmetry types. That technique is described above in the section "Finding a Part Symmetry".

```
find_a_part_symmetry(P, Q)
begin
    initialize S_best = x_best = 0
    initialize dom_best = to the empty set
    initialize success = FALSE
    for all symmetry types S do
        X = global_parameter_search(P, Q, S)
        for each parameter vector x in X do
            repeat
                dom = search_domain(P, Q, S, x)
                x = local_parameter_optimization(P, dom, S, x)
            until convergence
            if symmetry_acceptance_test(P, S, x, dom) and
                                              S > S_best
                S_best = S
                X_best = x
                dom_best = dom
                success = TRUE
            end if
        end for
    end for
    return success, S_best, x_best, dom_best
end
```

The procedure global_parameter_search takes as input the original surface point set P, the test point set Q, and symmetry type S. It uses the parameter grid G. Its output is a set of admissible symmetry parameters X. The grid specifies how the space of numerical symmetry parameters is to be sampled. For each point in the grid, the part symmetry is scored. Then, local maxima are found in the scored grid. In pseudo code, an exemplary global_parameter_search procedure reads as follows:

```
global_parameter_search(P, Q, S)
begin
    for each parameter vector x in grid G
        score(x) = score_symmetry(P, Q, S, x)
    end for
    X = set of parameter vectors x whose score(x) is locally optimal
        with respect to the grid G
return X
end
```

The procedure score_symmetry applies the symmetry feature <S, x> to a test point set Q and checks each of the resulting points to see where they lie. The score is a scaled linear combination of three terms: (1) the number of such points near one of the original visible points, (2) the number of such points that fall in occluded space, (3) the number of other points. The input is the original surface point set P, the test point set Q, the symmetry type S, and symmetry parameters x. The procedure uses parameters weights $c_{match}$, $c_{occluded}$, $c_{unexplained}$. It returns a score, $score_1$. In pseudo code, an exemplary score_symmetry procedure reads as follows:

```
score_symmetry(P, Q, S, x)
begin
    Q' = apply_symmetry(Q, S, x)
    initialize counts n_match = n_occluded = n_unexplained = 0
    for each point p in Q' do
        if p is near one or more points in P, increment n_match
        else if p is in the occluded space, increment n_occluded
        else increment n_unexplained
        end if
    end for
    compute total point count n = n_match + n_occluded + n_unexplained
    score_1 = (c_match n_match + c_occluded n_occluded + c_unexplained
        n_unexplained) / n
    return score_1
end
```

The procedure score_domain computes the size of a symmetry domain and characterizes the quality of the margin of the symmetry domain. The input is the original surface point set P and symmetry domain dom. The output is two scores, $score_2$ and $score_3$. In pseudo code, an exemplary score_domain procedure reads as follows:

```
score_domain(P, dom)
begin
    score_2 = | dom |
    initialize r_1 = 0 and r_2 = 0
    for all points q on the margin of dom do
        if there exists a point p in P not in dom but adjoining q
            increment r_1
        else
            increment r_2
        end if
    end for
    score_3 = r_1 / (r_1 + r_2)
    return score_2, score_3
end
```

The procedure apply_symmetry applies a symmetry feature <S, x> to a point set Q, by projecting each point in the point set Q to its symmetrical position(s) according to the symmetry type S. The input is the point set Q, the symmetry type S, and the symmetry parameters x. It output is an augmented point set Q'. In pseudo code, an exemplary apply_symmetry procedure reads as follows:

```
apply_symmetry(Q, S, x)
begin
    switch symmetry type S
        case mirror_plane_symmetry
            compute Q' by projecting Q through plane defined by
                parameters x
        case mirror_axis_symmetry
            compute Q' by projecting Q through axis defined by
                parameters x
        case rotational_axis_symmetry
            compute Q' by rotating Q about the axis defined by
                parameters x
        case mirror_point_symmetry
            compute Q' by projecting Q through the point defined by
                parameters x
        case rotational_point_symmetry
            compute Q' by rotating Q about the point defined by
                parameters x
```

```
        case dual_mirror_plane_symmetry
            compute Q' by projecting Q through all subset of planes
                defined by x
        case triple_mirror_plane_symmetry
            compute Q' by projecting Q through all subsets of planes
                defined by x
        case rotational_axis_with_orthogonal_plane_symmetry
            compute Q' by projecting Q through plane defined by
                parameters x, and rotating the resulting points
                along with the original points in Q about the axis
                defined by parameters x
    end switch
    return Q'
end
```

The procedure search_domain computes a domain for a symmetry feature <S, x>. The procedure first computes the largest connected component of the set of points consistent with the symmetry feature. The procedure then adds to this set those points on the boundary. The input is the original surface point set P, the partial point set Q, the symmetry type S, and symmetry parameters x. The procedure uses a parameter margin k. The output is the domain dom. In pseudo code, an exemplary search_domain procedure reads as follows:

```
search_domain(P, Q, S, x)
begin
    initialize D to the empty set
    for each point q in Q do
        point_score = score_symmetry(P, {q}, S, x)
        if point_score > 0
            add point D = D + {q}
        end if
    end for
    dom = largest connected component of D
    for i = 1 to k
        D_k = points in (P \ dom) that are adjoining a point in dom
        set dom = dom + D_k
    end for
    for i = 1 to k
        D_k = points in dom adjoining a point in (P \ dom)
        set dom = dom \ D_k
    end for
    return dom
end
```

The procedure local_parameter_optimization carries out a local search in the space of the numerical symmetry parameter. The search is performed by hill climbing. The input is the original surface point set P, the partial point set Q, the symmetry type S, and symmetry parameters x. The procedure uses the parameter grid G. The output is the improved symmetry parameters x'. In pseudo code, an exemplary local_parameter_optimization procedure reads as follows:

```
local_parameter_optimization(P, Q, S, x)
begin
    initialize x' = x
    score' = score_symmmetry(P, Q, S, x')
    repeat until convergence
        set x_0 = x
        perturb parameter set x
        score = score_symmetry(P, Q, S, x)
        if score > score'
            set score' = score
            set x' = x
        else
            x = x_0
        end if
    end repeat
    return x'
end
```

The procedure symmetry_acceptance_test screens part symmetries to exclude those part symmetries that do not meet established threshold criteria. An acceptable part symmetry has a large symmetry score, a large domain size, and a margin that is characterized by a relatively small number of points that adjoin points outside of the domain. The input is the original surface point set P, the symmetry type S, the symmetry parameters x, and the domain dom. The procedure uses the parameters thresholds $\theta$, $\psi$, $\phi$. The output is a Boolean accept. In pseudo code, an exemplary symmetry_acceptance_test procedure reads as follows:

```
symmetry_acceptance_test(P, S, x, dom)
begin
    score_1 = score_symmetry(P, dom, S, x)
    <score_2, score_3> = score_domain(P, dom)
    accept = (score_1 > θ) and (score_2 > ψ) and (score_3 < φ)
    return accept
end
```

The procedure repartition_domains analyzes a set of part symmetries for overlapping domains of the respective part symmetries, and then resolves any such overlaps. The result is a set of non-overlapping part symmetries. The procedure first identifies points that fall into more than one domain. The procedure then removes those points from all domains. In the next phase, the procedure restores points that have been removed to the nearest domain to each such point, where nearness is computed by a geodesic distance. In the final phase, the procedure performs a local optimization on the symmetry parameters for each part symmetry. The input is the original surface point set P and symmetry set Y. The output is a refined symmetry set Y' in which domains do not overlap. In pseudo code, an exemplary repartition_domains procedure reads as follows:

```
repartition_domains(P, Y)
begin
    initialize Q to be the empty set
    for each point p
        c(p) = 0
        for each part symmetry <S, x, dom> ∈ Y
            if p in dom
                increment c(p) by one
            end if
        end for
        if c(p) ≥ 2
            Q = Q + {p}
        end if
    end for
    for each part symmetry <S, x, dom> ∈ Y
        dom = dom \ Q
    end
    while |Q| > 0
        for each part symmetry <S, x, dom> ∈ Y
            identify the set of points Q' ⊆ Q adjoining dom
            add Q' to dom
            subtract Q' from Q
        end for
    end while
```

```
    for each part symmetry <S, x, dom> ∈ Y
        x = local_parameter_optimization(P, dom, S, x)
    end for
    Y' = {<S, x, dom>}
return Y'
end
```

Alternative Embodiments and Implementations

The invention has been described above with reference to certain preferred embodiments and implementations. Various alternative embodiments and implementations are set forth below. It will be recognized that the following discussion is intended as illustrative rather than limiting.

Viewpoints

In the preferred embodiment, the visible range data is acquired from essentially a single viewpoint so that approximately one-half of the surfaces are visible. In some alternative embodiments the initial 3D map of the visible surface is generated from multiple viewpoints. Accordingly, the 3D map can include range information for much more of the surface than if a single viewpoint is used, but the 3D map can still have certain occluded regions due either to self-occlusion or intra-occlusion. It will be understood that the present invention operates on the 3D map of the visible surfaces irrespective of how the 3D map was acquired. Therefore, any number of viewpoints, and any suitable algorithm for deriving range information from the viewpoints, can be used to create the initial 3D map.

Acquiring Range to Visible Surfaces

In preferred embodiments, the range to visible surfaces is acquired using multiple cameras and stereo correspondence. In some alternative embodiments, range information can be acquired by a single moveable camera used to obtain images from multiple viewpoints; by a single camera used together with a structured light source; by a laser range finder, or by radar. The range information can also be acquired by techniques based on determining range from image focus or by special 2D sensors that measure time of flight. Additionally, the images need not be acquired in the visible spectrum; for example infrared, sound, and microwave images can also be used. There are many equivalent ways in which the range to the visible surfaces may be acquired to create the initial 3D map of the visible surfaces.

Visibility

In preferred embodiments, the criterion for visibility is determined by the opacity of materials when illuminated by light in the visible portion of the electromagnetic spectrum. A surface is not visible if an opaque surface lies between it and the camera. When sensors with other characteristics are used, the meaning of visibility is determined by the opacity of materials with respect to the imaging modality of that sensor. It will be appreciated that some embodiments use multiple imaging modalities to create the initial 3D map of the visible surface, as surfaces that are occluded in one modality can be visible in another. Surfaces that are occluded to all of the employed modalities are inferred as above.

Sampling

In preferred embodiments, points are sub-sampled as described above. In alternative embodiments, different sampling techniques are used. For instance, rather than sub-sampling, all of the data points are used. This sampling technique keeps all of the data, which is advantageous for accuracy, but suffers long computation times. Alternatively, the points can be sub-sampled so that equal sized areas receive an equal number of data points. This criterion can be applied either globally or locally. One technique is to sub-sample with a density based on the surface normal, so that relatively more points are kept for areas that are tilted away from the viewing position.

Alternatively, a tessellated mesh can be fitted to the data points and sampled so that equal sized areas receive an equal number of data points. In other embodiments, analytic surfaces are fitted to the points, and then the analytic surfaces are sampled so that equal sized areas receive an equal number of data points. The 3D visible surface data may be sampled in many other equivalent ways.

Representation of the Visible Surface

In some preferred embodiments, the visible surface is represented as a point cloud. In alternative embodiments, the visible surface is represented as a triangle mesh or some other form of tessellated mesh. In other embodiments, the visible surface is represented as a collection of analytical surfaces such as quadrics or Bezier patches. The visible surface can be represented in many other equivalent ways.

Representation of Local Symmetries

An important property of the present invention is the ability to detect and utilize local symmetries, i.e. symmetries that are present in only a region of an object. To represent these local symmetries, the preferred embodiment uses the concept of "part symmetry," which consists of a symmetry type, a numerical parameter vector, and a domain. Alternative embodiments may use other techniques to represent local symmetries.

Representation of Domains

In the preferred embodiments, local regions to which symmetries apply are represented by symmetry domain functions, as described above. In alternative embodiments, such regions are represented in alternative ways. For example, in those embodiments in which the 3D map of the visible surface is represented as a triangle mesh, a local region to which a symmetry feature applies can be represented by a subset of all triangles.

Alternatively, domains can be represented via geometric constraints. As an example, where the domain of a symmetry corresponds to a set of points inside an ellipsoid, the parameters of the ellipsoid are sufficient to specify the shape of the domain. More generally, a domain may be characterized through any numerical function f, which maps each surface point p to a real number. Such a function is known as an "implicit function," and it may define the domain to be the set of all points p for which $f(p)<0$. The boundary of the domain is then a level set of the implicit function. Many other methods exist for defining region boundaries in 2D and 3D spaces, such as active contours, snakes, and splines. For example, a domain may be represented by an active contour in the space of the camera image, and the search through the domain involves changing the parameters of this active contour. It should be understood that there exist many alternative ways in which the domain can be represented, and this description is only illustrative rather than limiting.

Properties of Domains

In preferred embodiments, the domain of a symmetry consists of a contiguous point cloud. It will be recognized that the invention is not limited to contiguous point sets. Often, an object will have a symmetry that applies to multiple parts of the object that are connected by other parts that do not possess the same symmetry. In such cases the point cloud will not be contiguous. In an alternative embodiment, symmetry domains can consist of multiple point clouds that do not need to be contiguous. The use of a contiguous point cloud in descriptions of the preferred embodiments, above, is intended to be illustrative rather than limiting.

Further, in preferred embodiments each surface point contributes to only one symmetry. This is enforced through the "repartition_symmetries" procedure, above. In alternative embodiments, points may contribute to multiple symmetries, e.g., by omitting this procedure.

Symmetry Types

In preferred embodiments, 8 different symmetry types are considered: mirror plane, mirror axis, rotational axis, mirror point, rotational point, and certain compatible conjunctions of these. In alternative embodiments, other symmetry types are used. For example, objects (and 3D maps of the objects) can be characterized by multiple non-orthogonal symmetries. For example, an object may be characterized by three mirror planes that are not orthogonal to each other.

Additionally, rotational and mirror symmetries may be generalized as follows. A generalized rotational symmetry uses an ellipse in place of a circle in the description of rotational axis symmetry and uses an ellipsoid in place of a sphere in the description of rotational point symmetry. A generalized mirror surface symmetry may be defined through a non-planar mirror surface. A generalized rotational axis symmetry may be defined through a curved axis. A generalized mirror axis symmetry may be defined through a curved axis. Such generalized symmetries have additional components of the numerical parameter vector to specify the additional degrees of freedom. Objects and their 3D maps can be characterized by these generalized symmetries. There are many other symmetry types that can be computed and used in construction of probable surfaces in occluded regions.

Scoring a Symmetry

In the preferred embodiments, a hypothesized part symmetry is scored as described above. In some alternative embodiments, a distance to a nearest visible point can be used in computing the score. Alternatively, the score can be based on a function of the distance such as the exponential of the distance, or the minimum of a quadratic of the distance and a constant. There are many alternative ways in which a part symmetry may be scored.

In the preferred embodiments, the only aspect of the object used in scoring the part symmetries is the spatial locations of the points that comprise the 3D map of the visible surfaces. In some alternative embodiments, the symmetries are evaluated by using additional 3D properties such as surface normals. For instance, points that match under a symmetry transformation should have consistent surface normals, i.e. the surface normal vector of one point should be mapped by the symmetry feature into the surface normal of the other point. Hence, a function measuring the consistency of surface normals can also be a weighted factor used in computing the score for a part symmetry. Furthermore, a scoring function can exploit natural relationships between surface normals and the location of a symmetry feature. For instance, in rotational symmetries, surface normals must intersect symmetry axes or symmetry points. Therefore, the distance between a surface normal to the symmetry axis or the symmetry point can be considered when scoring a symmetry. Additionally, other attributes can be used such as appearance data, e.g., intensity, color, and texture. There are many ways in which additional attributes, suitably weighted, can be incorporated into the assessment of part symmetries.

In the preferred embodiments, a domain is scored by the characteristic of its size and shape. Specifically, the preferred embodiment computes a shape score, $score_3$, as $$score_3 = r_1/(r_1+r_2)$$

where $r_1$ is the total number of points in a margin of the domain that adjoin points outside of the domain, and $r_2$ is the total number of points in the margin that do not adjoin points outside of the domain. In alternative embodiments, the shape can be scored in various other ways that measure the suitability of the domain to be a region of local symmetry. For example, another figure of shape merit, $score_{3B}$, may be computed as follows:

$$score_{3B} = r_1/\sqrt{|dom|}$$

In this case, requiring $score_{3B}$ to be less than a threshold limits acceptable domains to those that have a small number of points that adjoin points outside of the domain relative to the total number of points within the domain. Other alternative measures can additionally consider the convexity of a domain, for example, penalizing a domain to the extent that it is not convex. There are many other ways in which the shape of a domain can be scored to ensure that the domain is a suitable region of a local symmetry.

Top-Down vs Bottom-Up Overall Search Strategy

In the preferred embodiments, the overall search strategy is to find a symmetry feature, find a domain that is consistent with the symmetry feature, and then jointly optimize the symmetry feature and the domain. This is essentially a "top-down" search strategy. In some alternative embodiments, a bottom-up overall strategy is implemented.

A bottom-up strategy begins by identifying candidate domains by searching for local regions that are "part-like." Candidate domains can be found by a variety of techniques including skeletonization, searching for regions with a large interior and few points of adjacency with the rest of the object, or computing surface patches that conform to part-like areas. In a bottom-up technique, once a part-like region is identified, the region is tested for symmetry and has symmetry features computed for it. Then the domain and features can be jointly optimized. A bottom-up technique can be advantageous in cases where regions of local symmetry are small with relatively little support, so that concentrating attention locally may be the best way to find part symmetries local to these small areas.

Selecting Initial Values for the Search on Symmetry Features

In the preferred embodiments, the initial values for the search for symmetry features are a regularly spaced grid of locations in the space of numerical parameters. This uses features that intersect with the center of mass of the point cloud. Some alternative embodiments select starting points for this search in alternative ways. For example, the Hough transform can be used to find dominant planes that can be employed in selecting starting points for the orientation of mirror planes. Alternatively, it is possible to analyze surface normals or other local shape features of the observed point cloud to select starting points. Alternative embodiments can also take advantage of environmental considerations to select initial starting points for the search. For example, an alternative embodiment may exploit the following observation. For each rotational symmetry, the surface normals of the visible surfaces must intersect with the rotational symmetry axis or point. When searching for rotational symmetries, a Hough transform can be applied to identify likely locations of rotational symmetry features by identifying features that intersect with many surface normals. The initial search may only consider vertical features (mirror planes, axes of radial symmetry) to exploit the fact that in many objects, symmetry features are vertical. Alternative embodiments can also analyze object features to initialize the search. For instance, an image analysis of an initial image from which the 3D map of the visible surfaces was derived can reveal geometric features such as lines that are likely to represent symmetric aspects of the object. In alternative embodiments, the initial starting point can be determined locally and not be related to the center of mass.

Optimization of the Numerical Parameter Vector

In the preferred embodiments, the optimization of the numerical parameter vector is carried out by hill climbing. In alternative embodiments, the optimization can be carried out by conjugate gradient descent, quasi-Newton methods, or by other optimization methods. In some cases, the optimization may be carried out by principal component analysis or by convex optimization techniques. There are many ways in which it is possible to search for a local maximum of a function.

Symmetry Domain Search

Given a symmetry type and an initial value for the numerical parameter vector and the domain, a locally optimal value for the part symmetry is found by searching in the spaces of parameter vectors and domains to find a pair that optimizes the symmetry score. Preferred embodiments perform a joint optimization loop that interleaves optimization of the domain and optimization of the numerical parameter vector.

In some alternative embodiments, the local symmetry search is carried out in other ways. For example, the domain can be optimized at each step of the numerical search. The domain can be grown to maximize the ratio of its interior points to its margin points. The domain can be described by bounding curves parameterized by a small number of numerical curve parameters, and the local symmetry search can be performed as a joint optimization of all the numerical parameters. There are many ways in which the domain can be optimized and many ways in which the numerical parameter vector and the domain may be jointly optimized.

Symmetries and Segmentation

In the preferred embodiments, an object is segmented starting with a single point cloud for that object. In some alternative embodiments, segmentation is implemented starting with various subsets, each corresponding to a local region, and finding part symmetries in each region. In other embodiments, part symmetries are searched for over the entire scene without segmenting particular objects from the rest of the scene. There are many ways to segment an image to identify local and global symmetry features.

Computing the Score of a Part Symmetry

The preferred embodiments compute a set of part symmetries and then use the set to compute the probable occluded surfaces. In these embodiments, a candidate part symmetry is one that passes a binary acceptance test, i.e. a part symmetry is either accepted or rejected. In some alternative embodiments, the binary test is replaced by a computation of a figure of merit such as the relative likelihood of the part symmetry, or any other numerical scoring function. This figure of merit can be attached to each reconstructed occluded surface to give a measure of confidence in that reconstructed surface.

Finding a Part Symmetry

When searching for a part symmetry, the method of the preferred embodiment may find multiple part symmetries that are acceptable; in this case, the method chooses the part symmetry with the highest-ranking symmetry type. In alternative embodiments, it is possible to make the choice based on additional criteria. For example, it is possible to also consider the size of the domain, or the size of the set of projected points.

Cleaning Up the Reconstructed Point Cloud

The preferred embodiments compute probable occluded surfaces by considering each part symmetry and applying the symmetry feature to each point in the domain. In some instances, projecting points through the symmetry feature can generate points in the interior of an object. Depending on the application, this may or may not be a concern. In some alternative embodiments, a clean-up step can be applied to remove most of these interior points. The technique includes removing all projected points that cannot be seen by an observer situated outside of the object. Thus, if a projected surface point is enclosed by the object in such a way that it is obscured from all possible viewing directions, the point can safely be removed. This removal step reduces the set of projected surface points to a subset that contains the probable surface points that were occluded when acquiring the original surface point cloud.

Representing Reconstructed Occluded Surfaces

In the preferred embodiments, the reconstructed occluded surfaces are represented by the collection of symmetric points. In some alternative embodiments, reconstructed occluded surfaces are represented by other means. Suppose, for example, that an application requires that a surface be represented by an analytic description, e.g. a quadric patch, and suppose that a plane is a chosen symmetric feature. If Qv is the quadric patch for a visible surface, then the corresponding quadric patch Qs for a symmetric surface can be constructed by a suitable transformation of the patch parameters based on the planar symmetry. There are well-known techniques for directly mapping the analytic surface description of one region into the analytic description of the corresponding symmetric region based on a particular symmetry feature.

In preferred embodiments, only a single symmetry is retained for each visible surface point, though several symmetries are often considered in choosing the retained symmetry. Alternative embodiments compute multiple competing symmetries, and assign a numerical weight to each, using the symmetry scoring function. When reconstructing the occluded regions, the multiple competing symmetries produce multiple alternative models of the occluded surfaces. Problems such as robotic manipulation can benefit from such multiple alternative reconstructions, in that they can potentially reduce the likelihood that a robotic end-effector will collide with the actual surface when attempting a grasp.

Objects

The preferred embodiments have been described using figures that show simple geometric objects chosen so that the operation of the invention could be readily described. The invention is not limited to such objects. It can also be applied to modeling complex structures, such as buildings, trees, people, and animals. It will be recognized that this list is intended as illustrative rather than limiting and the invention can be applied to images of many, varied physical structures and objects.

Computer Implementation of Procedural Steps

The procedural steps 502, and 503 of the preferred embodiment have been described in prose and in pseudo code. They can be implemented in a variety of programming languages, such as C++, C, Java, Ada, Fortran, or any other general-purpose programming language. These implementations can be compiled into the machine language of a particular computer or they can be interpreted. They can also be implemented in the assembly language or the machine language of a particular computer. The method can be implemented on a computer executing program instructions stored on a computer-readable medium.

Application to Robotic Grasping

The preferred embodiments have been described as producing a probable 3D map of the occluded surfaces. This 3D map of occluded surfaces, taken together with the 3D map of the visible surfaces, provides a surface description of the object. The surface description can be used by a grasp planner to compute desirable grasps of an object. Such a grasp planner is described in U.S. Provisional Patent Application Ser. No. 60/561,656, filed Apr. 12, 2004, entitled "System for Computing Desirable Grasps of Objects with Generally Shaped Surfaces," which is incorporated herein by reference. These grasp plans can be executed by a robotic system to grasp an object. Such a robotic system has the very useful property that it is able to grasp objects not previously encountered using only the information acquired from a single viewpoint.

Other Applications

The preferred embodiment has been described in the context of robotic grasping. The invention is not limited to this one application. The present invention can also be applied to the construction of video games in which it is desired to construct 3D models of objects, and in the construction of digital movies. It will be recognized that this list is intended as illustrative rather than limiting and the invention can be utilized for varied purposes.

Conclusion, Ramifications, and Scope

In summary, the invention disclosed herein detects symmetries in visible regions of a 3D map of an object and uses these symmetries to compute probable surfaces in occluded regions. The invention is able to utilize a wide variety of symmetries that frequently occur in objects of interest. Also, the invention is able to detect and utilize part symmetries that are both local and global to the object. The invention is able to detect symmetries in one visible region of an object and apply these symmetries to additional visible regions in reconstruction.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system for obtaining a probable 3D map of an occluded surface of an object, the system comprising:
   an imager configured to acquire an initial 3D map of a visible surface of the object; and
   a computing device configured to
      identify one or more symmetries of the initial 3D map, and
      compute the probable 3D map of the occluded surface from the one or more identified symmetries and the initial 3D map.

2. The system of claim 1 wherein the imager includes three cameras.

3. The system of claim 1 wherein the imager includes a patterned light projector.

4. The system of claim 1 wherein the imager is configured to acquire the initial 3D map by a dense stereo with active illumination process.

5. The system of claim 1 wherein the imager is configured to acquire the initial 3D map by integrating results from multiple imaging modalities.

6. The system of claim 1 wherein the imager includes a laser range finder.

7. A system for obtaining a probable 3D map of an occluded surface of an object, the system comprising:
   means for acquiring an initial 3D map of a visible surface of the object as viewed from a known viewpoint;
   means for identifying one or more symmetries of the initial 3D map; and
   means for computing the probable 3D map of the occluded surface from the one or more identified symmetries and the initial 3D map.

8. A method for determining a probable 3D map of an occluded surface of an object, comprising the steps of:
   acquiring an initial 3D map of a visible surface of the object as viewed from a known viewpoint;
   identifying one or more symmetries of the initial 3D map; and
   computing the probable 3D map of the occluded surface from the identified one or more symmetries and the initial 3D map.

9. The method of claim 8 wherein identifying the one or more symmetries of the initial 3D map includes finding one or more part symmetries, each of which is local to a portion of the initial 3D map.

10. The method of claim 9 wherein finding one of the part symmetries includes identifying a symmetry type, and calculating a numerical parameter vector and a domain.

11. The method of claim 10 wherein the symmetry type is chosen from a set including mirror plane symmetry, mirror axis symmetry, mirror point symmetry, dual mirror plane symmetry, triple mirror plane symmetry, rotational axis symmetry, rotational point symmetry, and the rotational axis symmetry paired with an orthogonal mirror plane symmetry.

12. The method of claim 10 wherein the symmetry type is chosen from a set including generalized rotational symmetries defined using ellipses for axis rotational symmetries and ellipsoids for point rotational symmetries.

13. The method of claim 10 wherein the symmetry type is chosen from a set including generalized mirror surface symmetries defined through non-planar mirror surfaces.

14. The method of claim 10 wherein the symmetry type is chosen from a set including generalized rotational axis symmetries defined through curved axes and generalized mirror axis symmetries defined through curved axes.

15. The method of claim 10 wherein identifying the symmetry type includes searching according to a hierarchy of candidate symmetry types.

16. The method of claim 15 wherein searching according to the hierarchy of candidate symmetry types begins with searching for a mirror plane symmetry type.

17. The method of claim 10 wherein calculating the numerical parameter vector includes searching a numerical parameter vector space at discrete points over the space, scoring the discrete points, and finding those discrete points that are local maxima with respect to the discrete points over the space.

18. The method of claim 17 wherein calculating the numerical parameter vector further includes a step of local parameter optimization wherein the initial values are the discrete points that are local maxima.

19. The method of claim 18 wherein the step of local parameter optimization includes performing a sequence of hill climbing steps.

20. The method of claim 18 wherein the step of local parameter optimization includes performing a conjugate gradient descent.

21. The method of claim 18 wherein the step of local parameter optimization includes performing a quasi-Newton method.

22. The method of claim 10 wherein calculating the numerical parameter vector and calculating the domain are performed by a joint optimization.

23. The method of claim 22 wherein the joint optimization is performed by interleaving the optimization of the numerical parameter vector and the optimizing of the domain in a joint optimization loop.

24. The method of claim 10 wherein calculating the domain includes calculating an initial domain, setting the domain equal to the initial domain, growing the domain by recursively adding points that adjoin the domain, and shrinking the domain by recursively removing points from the domain that adjoin points outside of the domain.

25. The method of claim 10 wherein computing the probable 3D map of the occluded surface includes projecting points in the domain according to the symmetry type and the numerical parameter vector.

26. The method of claim 9 wherein finding a part symmetry of the one or more part symmetries of the initial 3D map includes identifying a candidate domain, determining a symmetry feature for the candidate domain, and jointly optimizing the domain and the symmetry feature.

27. The method of claim 26 wherein identifying the candidate domain includes skeletonization.

28. The method of claim 26 wherein identifying the candidate domain includes searching for a region with a large interior and few points of adjacency with the rest of the object.

29. The method of claim 26 wherein identifying the candidate domain includes computing surface patches that conform to part-like areas.

30. The method of claim 8 wherein identifying the one or more symmetries of the initial 3D map includes selecting initial locations within the initial 3D map from which to begin a search for the symmetries.

31. The method of claim 30 wherein selecting initial locations includes using a grid of initial locations.

32. The method of claim 30 wherein selecting initial locations includes employing a Hough transform.

33. The method of claim 30 wherein selecting initial locations includes analyzing shape features of the initial 3D map.

34. The method of claim 33 wherein analyzing shape features includes analyzing visible surface normals for possible locations of rotational symmetry features.

35. The method of claim 30 wherein selecting initial locations includes searching for vertical features in the initial 3D map.

36. The method of claim 30 wherein selecting initial locations includes searching for local shape features.

37. The method of claim 36 wherein searching for local shape features includes searching for lines.

38. The method of claim 10 wherein the domain is represented by the union of multiple contiguous point sets.

39. The method of claim 10 wherein the domain is represented by an implicit function.

40. The method of claim 39 wherein the implicit function defines an ellipsoid.

41. The method of claim 10 wherein the domain is represented by an active contour.

42. The method of claim 10 wherein the domain is represented by a spline.

43. The method of claim 8 wherein the probable 3D map of the occluded surface comprises one or more probable surface regions and a measure of confidence is computed for each of the probable surface regions.

44. A system for obtaining a probable 3D map of an occluded surface of an object, the system comprising:
a computing device configured to
receive an initial 3D map of a visible surface of the object as viewed from a known viewpoint;
identify one or more symmetries of the initial 3D map; and
compute the probable 3D map of the occluded surface from the identified one or more symmetries and the initial 3D map.

45. A non-transitory computer-readable medium comprising program instructions for computing a probable 3D map of an occluded surface of an object, the program instructions comprising the steps of:
receiving an initial 3D map of a visible surface of the object as viewed from a known viewpoint;
identifying one or more symmetries of the initial 3D map; and
computing the probable 3D map of the occluded surface from the identified one or more symmetries and the initial 3D map.

46. A robotic system comprising:
an arm terminating in an end-effector having components for grasping an object, the object having an occluded surface;
an imager configured to acquire an initial 3D map of a visible surface of the object; and
a computing device configured to
identify one or more symmetries of the initial 3D map,
compute a probable 3D map of the occluded surface from the identified one or more symmetries and the initial 3D map, and
compute a grasp for the end-effector, the grasp describing positions of one or more of the components for grasping relative to the probable 3D map of the occluded surface.

47. The system of claim 1, wherein the occluded surface of the object is occluded by another surface of the object.

48. The system of claim 7, wherein the occluded surface of the object is occluded by another surface of the object.

49. The method of claim 8, wherein the occluded surface of the object is occluded by another surface of the object.

50. The system of claim 44, wherein the occluded surface of the object is occluded by another surface of the object.

51. The computer-readable medium of claim 45, wherein the occluded surface of the object is occluded by another surface of the object.

52. The robotic system of claim 46, wherein the occluded surface of the object is occluded by another surface of the object.

53. The method of claim 8 wherein identifying one or more symmetries of the initial 3D map comprises searching according to a hierarchy of candidate symmetry types.

54. The method of claim 8 wherein computing the probable 3D map of the occluded surface comprises projecting one or more visible surfaces of the initial 3D map according to one or more of the identified symmetries.

55. The method of claim 9 wherein each part symmetry has a domain and wherein computing the probable 3D map of the occluded surface comprises projecting one or more visible surfaces of the initial 3D map in the domains of found part symmetries according to the part symmetry.

56. The system of claim 44 wherein the computing device is further configured to identify one or more symmetries of the initial 3D map by searching according to a hierarchy of candidate symmetry types.

57. The system of claim 44 wherein the computing device is further configured to identify one or more symmetries of the initial 3D map by finding one or more part symmetries, each of which is local to a portion of the initial 3D map.

58. The system of claim 57 wherein each part symmetry has a domain and wherein the computing device is further configured to compute the probable 3D map of the occluded surface by projecting one or more visible surfaces of the initial 3D map in the domains of found part symmetries according to the part symmetry.

59. The system of claim 44 wherein the computing device is further configured to compute the probable 3D map of the occluded surface by projecting one or more visible surfaces of the initial 3D map according to one or more of the identified symmetries.

* * * * *